(12) United States Patent
Capoldi

(10) Patent No.: US 11,035,405 B2
(45) Date of Patent: Jun. 15, 2021

(54) ROLLING BEARING COMPRISING THREE CONCENTRIC RINGS

(71) Applicant: Aktiebolaget SKF, Gothenburg (SE)

(72) Inventor: Bruno Capoldi, Charentenay (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/792,653

(22) Filed: Feb. 17, 2020

(65) Prior Publication Data

US 2020/0347883 A1    Nov. 5, 2020

(30) Foreign Application Priority Data

Apr. 30, 2019    (DE) .......................... 102019206235.0

(51) Int. Cl.

| | | |
|---|---|---|
| *F16C 19/55* | (2006.01) | |
| *F16C 33/58* | (2006.01) | |
| *F16C 19/38* | (2006.01) | |
| *F16C 19/26* | (2006.01) | |
| *F16C 19/56* | (2006.01) | |

(Continued)

(52) U.S. Cl.
CPC .............. *F16C 19/55* (2013.01); *F16C 19/26* (2013.01); *F16C 19/38* (2013.01); *F16C 19/545* (2013.01); *F16C 19/56* (2013.01); *F16C 33/58* (2013.01); *F16C 33/581* (2013.01); *F16C 33/805* (2013.01); *F16C 2300/14* (2013.01); *F16C 2352/00* (2013.01); *F16C 2360/31* (2013.01); *F16C 2361/61* (2013.01)

(58) Field of Classification Search
CPC ........ F16C 19/34; F16C 19/36; F16C 19/361; F16C 19/362; F16C 19/38; F16C 19/381; F16C 19/54; F16C 19/541; F16C 19/545; F16C 19/55; F16C 19/56; F16C 33/58; F16C 33/581; F16C 33/583; F16C 33/586; F16C 2352/00; F16C 2360/31; F16C 2361/61; F16C 2360/63; F16C 2360/65; E21B 4/003; F03D 80/70; F16H 1/02; F16H 1/20; F16H 1/206; F16H 1/163

See application file for complete search history.

(56) References Cited

U.S. PATENT DOCUMENTS 4,618,271 A * 10/1986 Li ........................ F16C 33/306
                                                    384/461
8,348,598 B2 * 1/2013 Watanabe ............... F16C 19/52
                                                    415/131

(Continued)

FOREIGN PATENT DOCUMENTS

| CN | 102425601 A | 4/2012 |
|---|---|---|
| DE | 102004035587 A1 | 2/2006 |
| RO | 123080 B1 | 9/2010 |

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A rolling bearing including an inner ring, an outer ring and a middle ring, the rings being concentrically arranged around a central axis so that the middle ring is arranged radially between the inner ring and the outer ring, at least one row of rolling elements interposed between the inner ring and the middle ring, at least one row of rolling elements interposed between the middle ring and the outer ring. The inner ring provides a radially inner circumferential portion with a gear toothing and the outer ring having a radially outer circumferential portion with a gear toothing.

9 Claims, 3 Drawing Sheets

(51) Int. Cl.
*F16C 19/54* (2006.01)
*F16C 33/80* (2006.01)

(56) References Cited

U.S. PATENT DOCUMENTS

| | | | |
|---|---|---|---|
| 2010/0192927 A1* | 8/2010 | Roderique | F04D 13/028 |
| | | | 123/559.1 |
| 2010/0284641 A1* | 11/2010 | Aida | F03D 80/70 |
| | | | 384/507 |
| 2014/0047938 A1* | 2/2014 | Horiuchi | F16C 19/55 |
| | | | 74/412 R |
| 2017/0051786 A1* | 2/2017 | Bouron | F16C 19/38 |
| 2017/0356491 A1 | 12/2017 | Capoldi et al. | |
| 2020/0355165 A1* | 11/2020 | Rieken | F03D 1/0658 |
| 2020/0408251 A1* | 12/2020 | Zell | F16C 19/505 |

\* cited by examiner

ROLLING BEARING COMPRISING THREE CONCENTRIC RINGS

CROSS-REFERENCE TO RELATED APPLICATIONS

This application claims priority to German Patent Application no. 102019206235.0, filed Apr. 30, 2019, the contents of which are fully incorporated herein by reference.

FIELD OF THE INVENTION

The invention relates to the field of rolling bearings comprising three concentric rings, in particular large-diameter rolling bearings used in a tunnel boring machine.

BACKGROUND OF THE INVENTION

A large-diameter rolling bearing comprises generally two concentric inner and outer rings, and at least one row of rolling elements radially interposed between the rings. It is known to provide gear toothing on one of the rings, for driving the ring in rotation thanks to appropriate driving means. Such a bearing is known from US-2017-0356491-A1.

Rolling bearings with three concentric rings are also known. For instance, in DE-102004035587-A1, at least one of the rings is provided with an axial extension on which a bevel gear is arranged. This arrangement significantly increases the width of the bearing.

There seems to be room for improvement.

SUMMARY OF THE INVENTION

According to a first aspect of the invention, a rolling bearing comprises an inner ring, an outer ring and a middle ring so that the rings are arranged concentrically around a longitudinal axis, the middle ring being arranged radially between the inner ring and the outer ring. At least one row of rolling elements is interposed between the outer ring and the middle ring, and at least one row of rolling elements is interposed between the middle ring and the inner ring.

Still according to the invention, the inner ring comprises a radially inner circumferential portion with a gear toothing and the outer ring comprises a radially outer circumferential portion with a gear toothing.

According to other aspects of the invention which are advantageous, but not compulsory, such a rolling bearing may incorporate one or several of the following features:

the gear toothings of the inner and outer rings and the rows of rolling elements are substantially aligned radially, a first set of three rows of rolling elements is arranged between the outer ring and the middle ring, and a second set of three rows of rolling elements is arranged between the inner ring and the middle ring, a first row of crossed rollers between the outer ring and the middle ring, and a second row of crossed rollers between the inner ring and the middle ring.

Thanks to the invention, the inner ring and the outer ring can be driven in rotation independently from each other.

The rolling bearing according to the invention is compact axially.

According to a second aspect of the invention, a machine comprises a rolling bearing according to the invention, a frame attached to the middle ring, first driving means for driving in rotation the outer ring, second driving means for driving in rotation the inner ring (10), a first machine element attached to the outer ring (20) and a second machine element attached to the inner ring.

According to other aspects of the invention which are advantageous, but not compulsory, such a rolling bearing may incorporate one or several of the following features:

the first driving means comprises a plurality of gears engaging with the gear toothing of the outer ring, and the second driving means comprises a plurality of gears engaging with the gear toothing of the inner ring, the plurality of gears of the first driving means engage simultaneously with the outer ring, and in the plurality of gears of the second driving means engage simultaneously with the inner ring, the gears and the rows of rolling elements are substantially aligned radially, the machine is a tunnel boring machine, and the first machine element and the second machine element are drilling wheels.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION

Figure 1:
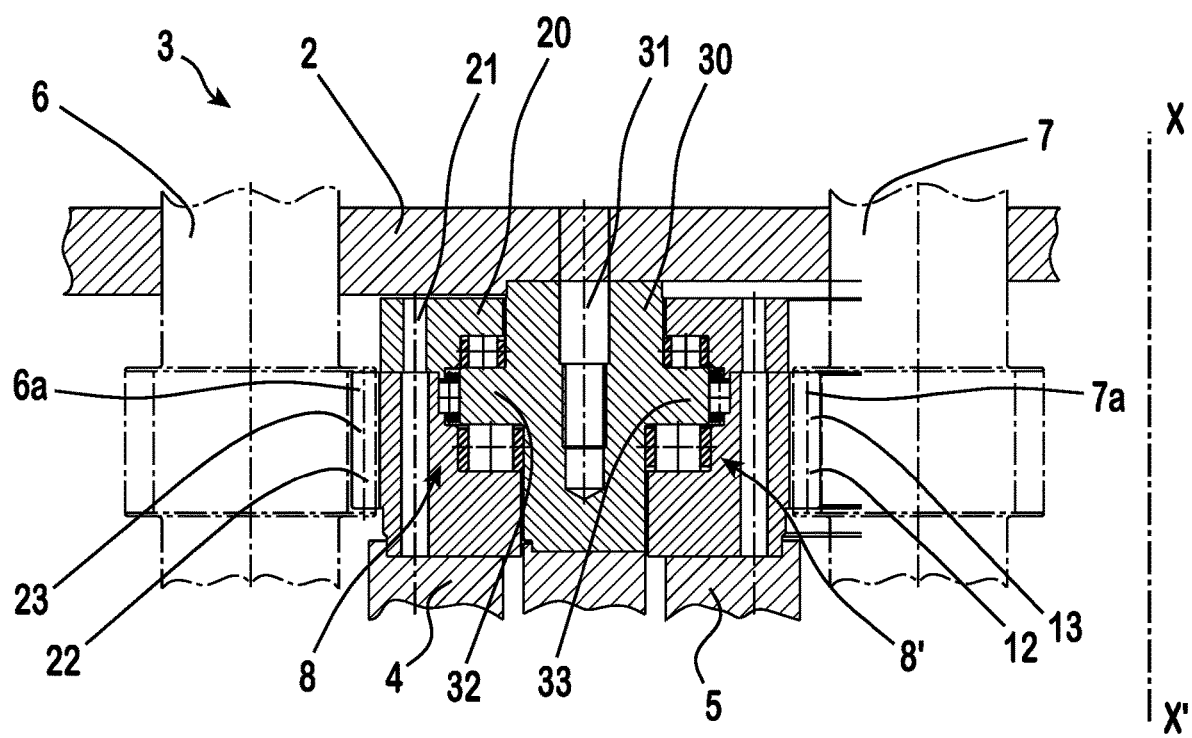
FIG. 1 illustrates in a longitudinal cross section a rolling bearing according to a first embodiment of the invention.
Figure 2:
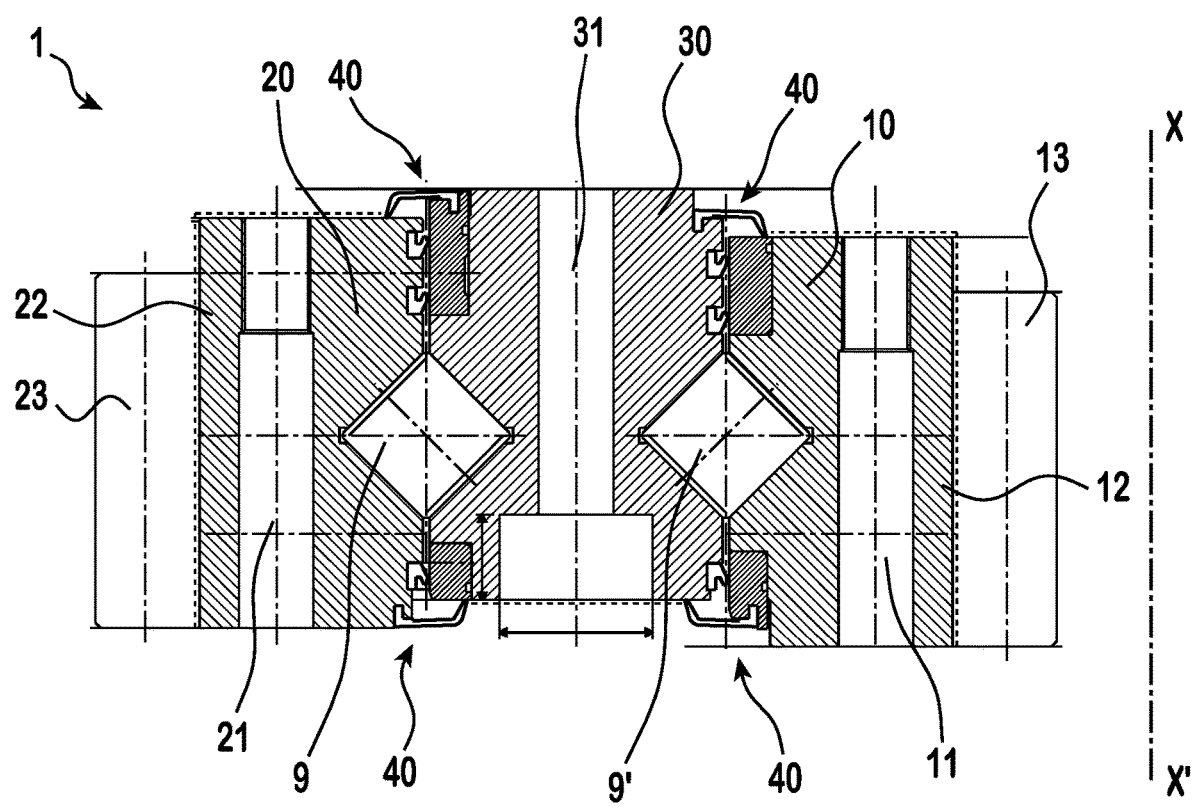
FIG. 2 illustrates in a longitudinal cross section a second embodiment of a rolling bearing according to the invention.
Figure 3:
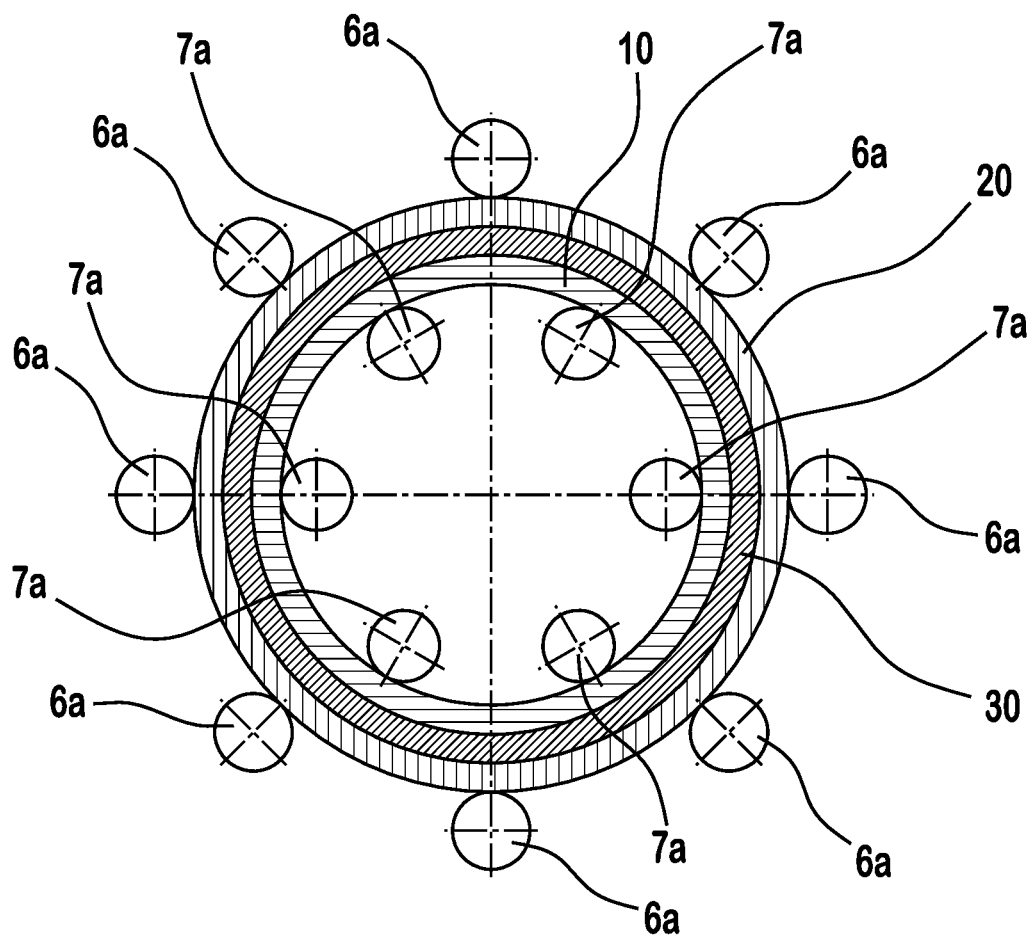
FIG. 3 illustrates schematically in a longitudinal view a rolling bearing according to the invention.

FIGS. 1-3 illustrate a rolling bearing 1 comprising an inner ring 10, an outer ring 20 and a middle ring 30. The three rings are arranged concentrically around a longitudinal axial axis XX'. The middle ring 30 is arranged radially between the inner ring and the outer ring.

At least one row of rolling elements is arranged between the outer ring and the middle ring, and at least one row of rolling elements is arranged between the inner ring and the middle ring.

The middle ring comprises a plurality of attachment means 31 for fixing the bearing to a frame 2 of a machine 3.

The outer ring comprises a plurality of attachment means 21 for fixing a first machine element 4 to the bearing.

The outer ring comprises a radially outer circumferential portion 22 on which a gear toothing 23 is arranged.

The inner ring comprises a plurality of attachment means 11 for fixing a second machine element 5 to the bearing.

The inner ring comprises a radially inner circumferential portion 12 on which a gear toothing 13 is arranged.

The gear toothings of the inner and outer rings and the rows of rolling elements are substantially aligned radially. Hence, the rolling bearing is very compact axially. Actually, it is as axially compact as the same rolling bearing without the gear toothings.

The machine comprises a first driving means 6 with at least one gear 6a for engaging with the gear toothing 23 of the outer ring 20.

The machine further comprises a second driving means 7 with at least one gear 7a for engaging with the gear toothing 13 of the inner ring 10.

The inner ring and the outer ring are driven in rotation independently from each other.

In the illustrated embodiments, the attachment means of the inner, outer and middle rings are through-holes with threaded portions, and pluralities of screws (not shown) are used to secure the middle ring to the machine frame, the outer ring to the first machine element, and the inner ring to the second machine element.

FIG. 1 illustrates a first preferred embodiment of a rolling bearing according to the invention.

The outer ring is made of two adjacent rings, and the inner ring is made of two adjacent rings.

A first set 8 of three rows of rolling elements is arranged between the outer ring and the middle ring, and a second set 8' of three rows of rolling elements is arranged between the inner ring and the middle ring.

The middle ring comprises two radial protrusions 32, 33. A first radial protrusion 32 extends radially outwardly towards the outer ring, and a second radial protrusion 33 extends radially inwardly towards the inner ring. The first radial protrusion has three raceways for the first set 8 of three rows of rolling elements, and the second radial protrusion has three raceways for the second set 8' of three rows of rolling elements.

Each set of three rows of rolling elements is made of two axial rows and one radial rows.

Preferably, the rolling elements are cylindrical rollers.

Based on the loads to be applied on the rolling bearing in operation, one can selectively adjust certain parameters of the rolling bearing such as the size and the number of teeth for each gear toothing, or the type, the size and the number of rolling elements.

FIG. 2 illustrates another preferred embodiment of the invention which differs from the embodiment of FIG. 1 in what follows. There is a first row 9 of crossed rollers between the outer ring and the middle ring and a second row 9' of crossed rollers between the middle ring and the inner ring.

In a preferred embodiment of the invention, the rolling bearing comprises a plurality of sealing devices 40 for protecting the rows of rolling elements against external pollution.

As illustrated on FIG. 3, the gear toothing 23 of the outer ring 20 extends over the entire radially outer circumference 22 of the outer ring, and the gear toothing 13 of the inner ring 10 extends over the entire radially inner circumference 12 of the inner ring.

The first driving means 6 comprises a plurality of gears which are disposed around the outer ring. Preferably, the gears are disposed at regular circumferential distances from each other.

The second driving means 7 comprises a plurality of gears which are disposed in the bore of the inner ring. Preferably, the gears are arranged at regular circumferential distances from each other.

In a preferred embodiment, the first driving means comprises eight gears and the second driving means comprises six gears.

Advantageously, the gears of the first driving means engage simultaneously with the gear toothing of the outer ring.

Advantageously, the gears of the second driving means engage simultaneously with the gear toothing of the inner ring.

The gears of the first and second driving means and the rows of rolling elements are substantially aligned radially. Hence, there is no tilting moment applied on the bearing by the driving means and vice-versa.

In a preferred embodiment of the invention, the rolling bearing is of the large-diameter type, and the machine is a tunnel boring machine, the first machine element is a first drilling wheel, and the second machine element is a second drilling wheel. Furthermore, the outer ring and the inner and driven in rotation in opposite direction, for instance the inner ring is driven in a clockwise fashion and the outer ring is driven in an anti-clockwise fashion. Hence, the first and second drilling wheels are driven in opposite directions.

REFERENCE NUMBER/ELEMENT LIST 1 rolling bearing
2 frame
3 machine
4 first machine element
5 second machine element
6 first driving means
6a gear
7 second driving means
7a gear
8 first set of three rows of rollers
8' second set of three rows of rollers
9 first row of crossed rollers
9' second row of crossed rollers
10 inner ring
11 attachment means
12 radially inner circumferential portion
13 gear toothing
20 outer ring
21 attachment means
22 radially outer circumferential portion
23 gear toothing
30 middle ring
31 attachment means
32 first protrusion
33 second protrusion
40 seals

The invention claimed is:

1. A rolling bearing comprising:
an inner ring,
an outer ring, and
a middle ring, wherein
the inner ring, the outer ring and the middle ring are concentrically arranged around a central axis so that the middle ring is arranged radially between the inner ring and the outer ring,
at least one row of rolling elements interposed between the outer ring and the middle ring,
at least one row of rolling elements interposed between the middle ring and the inner ring, and wherein
the inner ring comprises a radially inner circumferential portion having a gear toothing,
the outer ring comprises a radially outer circumferential portion having a gear toothing, and
the gear toothings of the inner and outer rings and the rows of rolling elements are substantially aligned radially.

2. The rolling bearing according to claim 1, further comprising a first set of three rows of rolling elements is arranged between the outer ring and the middle ring, and in that a second set of three rows of rolling elements is arranged between the inner ring and the middle ring.

3. The rolling bearing according to claim 1, further comprising a first row of crossed rollers being provided between the outer ring and the middle ring, and a second row of crossed rollers being provided between the inner ring and the middle ring.

4. The rolling bearing according to claim 1, further comprising sealing means for protecting against external pollution of rolling chambers containing the rows of rolling elements.

5. A machine comprising:
a rolling bearing having an inner ring, an outer ring, and a middle ring, wherein the inner ring, the outer ring and the middle ring are concentrically arranged around a central axis so that the middle ring is arranged radially between the inner ring and the outer ring, at least one row of rolling elements interposed between the outer ring and the middle ring, at least one row of rolling elements interposed between the middle ring and the inner ring, and wherein the inner ring comprises a radially inner circumferential portion having a gear toothing, and the outer ring comprises a radially outer circumferential portion having a gear toothing,
a frame attached to the middle ring,
first driving means for driving in rotation the outer ring,
second driving means for driving in rotation the inner ring,
a first machine element attached to the outer ring, and
a second machine element attached to the inner ring.

6. The machine according to claim 5, wherein the first driving means comprises a plurality of gears engaging with the gear toothing of the outer ring, and the second driving means comprises a plurality of gears engaging with the gear toothing of the inner ring.

7. The machine according to any claim 6, wherein the plurality of gears of the first driving means engage simultaneously with the outer ring, and the plurality of gears of the second driving means engage simultaneously with the inner ring.

8. The machine according to claim 6, wherein the gears and the rows of rolling elements are substantially aligned radially.

9. The machine according to claim 5, wherein the machine is a tunnel boring machine and the first machine element and the second machine element are drilling wheels.

* * * * *